United States Patent [19]

Inoue

[11] Patent Number: 4,658,006

[45] Date of Patent: Apr. 14, 1987

[54] METHOD FOR THE PREPARATION OF ALKOXY-CONTAINING ORGANOPOLYSILOXANE

[75] Inventor: Yoshio Inoue, Annaka, Japan

[73] Assignee: Shin-Etsu Chemical Co., Ltd., Tokyo, Japan

[21] Appl. No.: 846,242

[22] Filed: Mar. 31, 1986

[30] Foreign Application Priority Data

Apr. 15, 1985 [JP] Japan .................................. 60-79566

[51] Int. Cl.$^4$ ............................................. C08G 77/04
[52] U.S. Cl. ...................................... 528/29; 525/474; 525/475; 525/477; 528/34; 556/457; 556/458; 556/470
[58] Field of Search ....................... 556/457, 458, 470; 528/29, 34; 525/474, 475, 477

[56] References Cited

U.S. PATENT DOCUMENTS 3,344,160  9/1967  Holbrook ........................... 556/457
4,426,480  1/1984  Petty .................................. 556/457

Primary Examiner—Melvyn I. Marquis
Attorney, Agent, or Firm—Hopgood, Calimafde, Kalil, Blaustein & Judlowe

[57] ABSTRACT

A diorganopolysiloxane terminated at both molecular chain ends each with a monohydrocarbyl dialkoxy silyl group, which is useful as a base ingredient in room temperature-curable silicone rubber compositions, is prepared by first reacting a silanol-terminated diorganopolysiloxane with a monohydrocarbyl tri(ketoxime) silane to replace the silanolic hydroxy group with a monohydrocarbyl di(ketoxime) siloxy group and then reacting the oxime-terminated diorganopolysiloxane with a monohydric alcohol, e.g. methyl alcohol, to replace the ketoxime groups with alkoxy groups. The reactions can proceed under very mild conditions without any catalyst so that the desired alkoxy-terminated diorganopolysiloxane is obtained in a high purity.

6 Claims, 10 Drawing Figures

METHOD FOR THE PREPARATION OF ALKOXY-CONTAINING ORGANOPOLYSILOXANE

BACKGROUND OF THE INVENTION

The present invention relates to a method for the preparation of an alkoxy-containing organopolysiloxane or, more particularly, to a method for the preparation of a diorganopolysiloxane terminated at both molecular chain ends each with a monohydrocarbyl dialkoxy silyl group which is useful as a principal ingredient in a room temperature-curable organopolysiloxane composition.

As is well known, the principal ingredient in a class of room temperature-curable organopolysiloxane compositions is a diorganopolysiloxane terminated at both molecular chain ends each with a silanolic hydroxy group, i.e. a hydroxy group directly bonded to the silicon atom, and the curing reaction of the composition into a cured rubber proceeds by the dealcoholation condensation between the above mentioned silanol groups and the alkoxy groups of the alkoxy-containing organosilane or a partial hydrolysis-condensation product thereof to act as a crosslinking agent formulated in the composition as another essential ingredient. Because the condensation product formed by the condensation reaction is an alcoholic compound having no corrosiveness and irritative odor, room temperature-curable organopolysiloxane compositions of this type are advantageously used as an adhesive of various electronic materials. These compositions are disadvantageous, however, in respect of their relatively low velocity of curing and poor storability even under an anhydrous condition to lose curability. The instability of the composition in storage is presumably due to the hydrolytic decomposition of the alkoxy groups of the crosslinking agent by the reaction with the silanol groups. It is known that a solution of this problem can be obtained by replacing the silanol-terminated diorganopolysiloxane with a diorganopolysiloxane having an alkoxy group bonded to each of the terminal silicon atoms and a room temperature-curable organopolysiloxane composition of dealcoholation type formulated with such an alkoxyterminated diorganopolysiloxane has excellent storability and exhibits good curing behavior.

The above mentioned alkoxy-containing organopolysiloxane is conventionally prepared by the condensation reaction of a silanol-terminated diorganopolysiloxane and an organosilane compound having alkoxy groups and a hydrolyzable group and represented by the general formula $$(R^6O)_2(R^3)SiY,$$

in which $R^3$ is a monovalent group selected from the class consisting of methyl, ethyl, propyl, phenyl and 3,3,3-trifluoropropyl groups, $R_6$ is a halogen-substituted or unsubstituted monovalent hydrocarbon group having 1 to 8 carbon atoms and Y is a hydrolyzable atom or group excepting alkoxy groups. In view of the reactivity with the silanol groups in the diorganopolysiloxane, the hydrolyzable group denoted by Y is preferably a halogen atom since a considerable amount of the silanol groups may remain unreacted when the hydrolyzable group denoted by Y is not a halogen atom due to the low reactivity. The dehydrohalogenation condensation between such a halogenosilane and the silanol-terminated diorganopolysiloxane involves several industrially difficult problems including the use of a relatively expensive acid acceptor such as triethyl amine, pyridine, picoline and the like in the reaction mixture and disposal of the hydrohalide of the acid acceptor as a by-product of the reaction.

SUMMARY OF THE INVENTION

The method of the present invention for the preparation of an alkoxy-terminated organopolysiloxane compound without the above described problems and disadvantages in the prior art methods comprises the steps of:

(a) reacting a silanol-terminated diorganopolysiloxane represented by the general formula

in which each $R^1$ is a monovalent group selected from the class consisting of methyl, vinyl, phenyl and 3,3,3-trifluoropropyl groups and the subscript n is a positive integer, preferably, in the range from 20 to 1000, with an oxime group-containing organosilane compound represented by the general formula $$R^3Si(O-N=X)_3, \qquad (II)$$

in which $R^3$ is a monovalent group selected from the class consisting of methyl, ethyl, propyl, vinyl, phenyl and 3,3,3-trifluoropropyl groups and X is a divalent group represented by the general formula $=CR^4_2$, $R^4$ being a halogen-substituted or unsubstituted monovalent hydrocarbon group, or

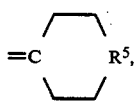

$R^5$ being a halogen-substituted or unsubstituted divalent hydrocarbon group, in a molar ratio of the silane compound to the silanol groups in the diorganopolysiloxane of at least 1 under a substantially anhydrous condition to form an intermediate diorganopolysiloxane represented by the general formula

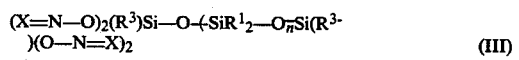

in which the symbols $R^1$, $R^3$, X and n each have the same meaning as defined above; and (b) reacting the thus obtained intermediate diorganopolysiloxane represented by the general formula (III) above with a monohydric alcohol represented by the general formula $$R^6OH, \qquad (IV)$$

in which $R^6$, is a monovalent hydrocarbon group having 1 to 8 carbon atoms, in a molar ratio of the monohydric alcohol to the oxime group of the formula $-O-N=X$ in the intermediate diorganopolysiloxane of at least 1 to form an alkoxyterminated diorganopolysiloxane represented by the general formula

in which the symbols $R^1$, $R^3$, $R^6$ and n each have the same meaning as defined above.

DETAILED DESCRIPTION OF THE PREFERRED EMBODIMENTS

Figure 1:
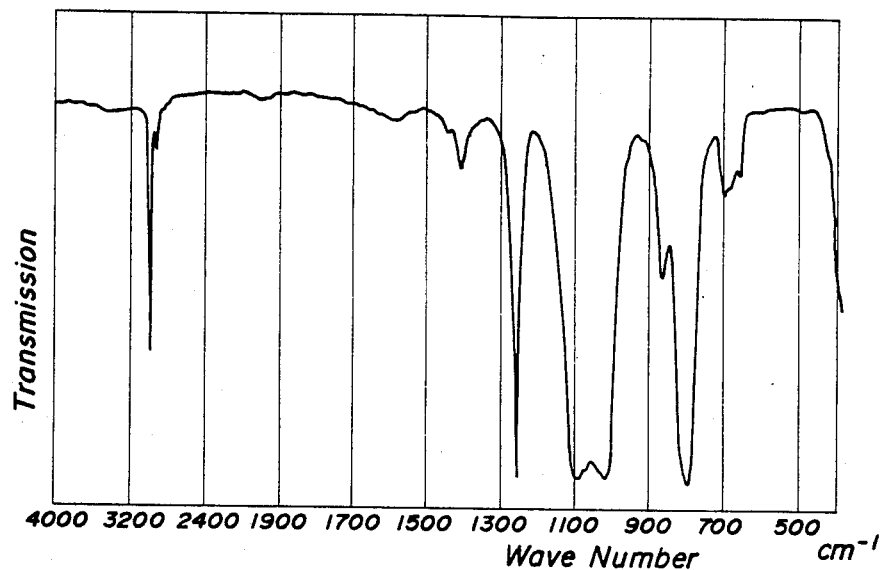
FIGS. 1 to 7 are each an infrared absorption spectrum of the organopolysiloxane prepared in Examples 1 to 7, respectively.
Figure 2:
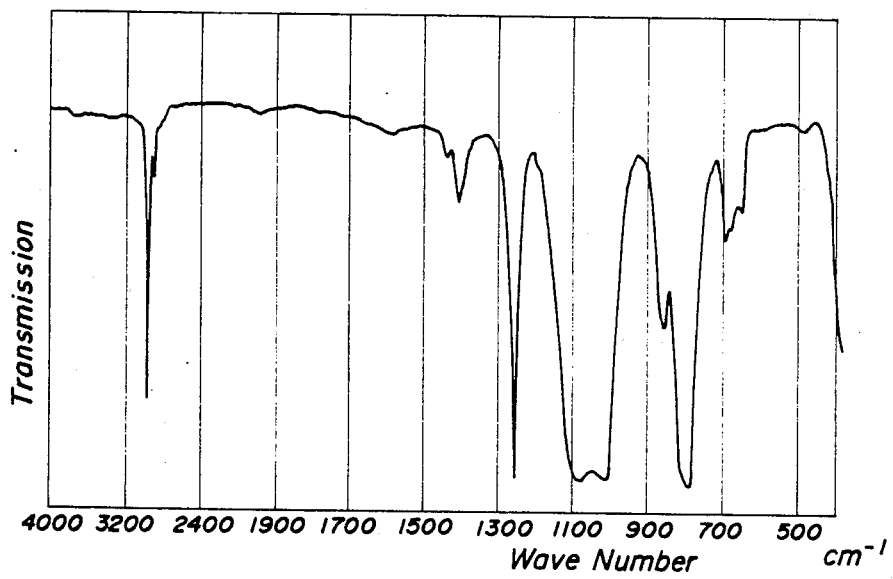
Figure 3:
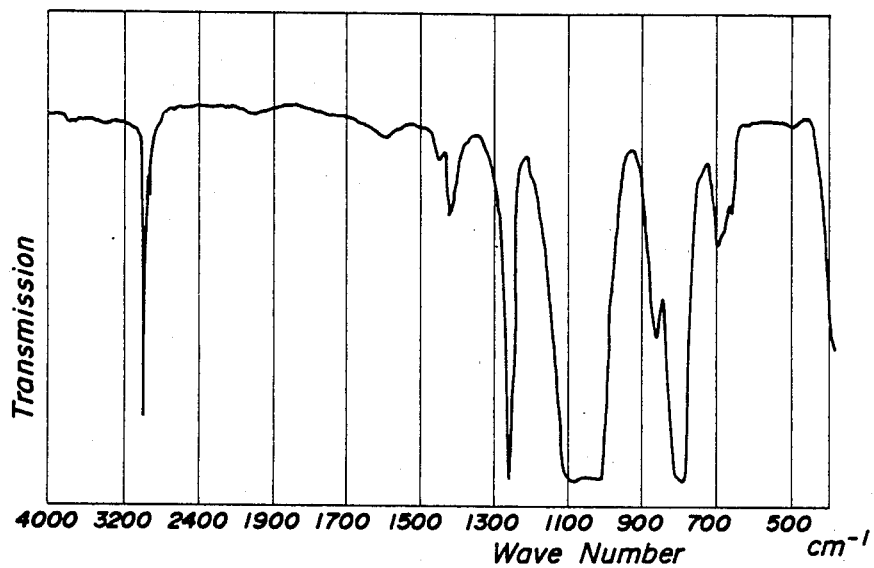
Figure 4:
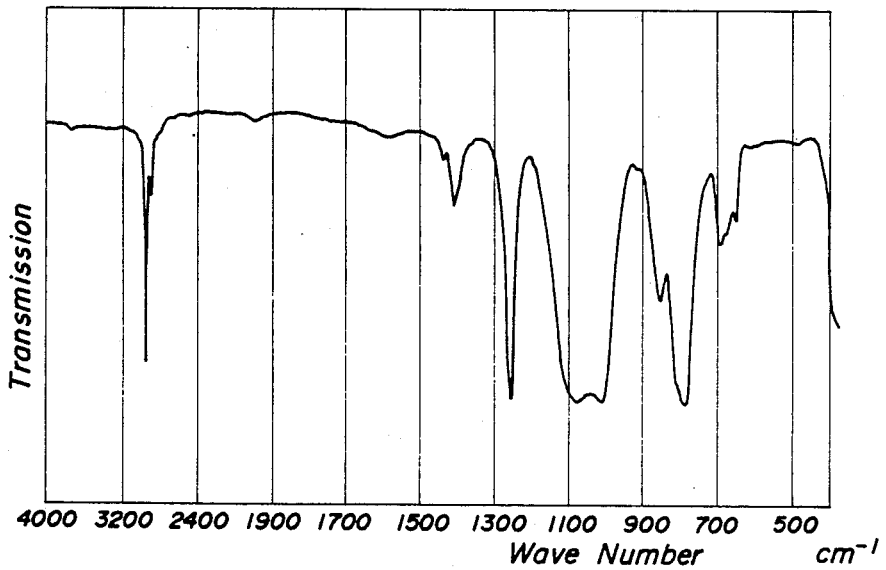
Figure 5:
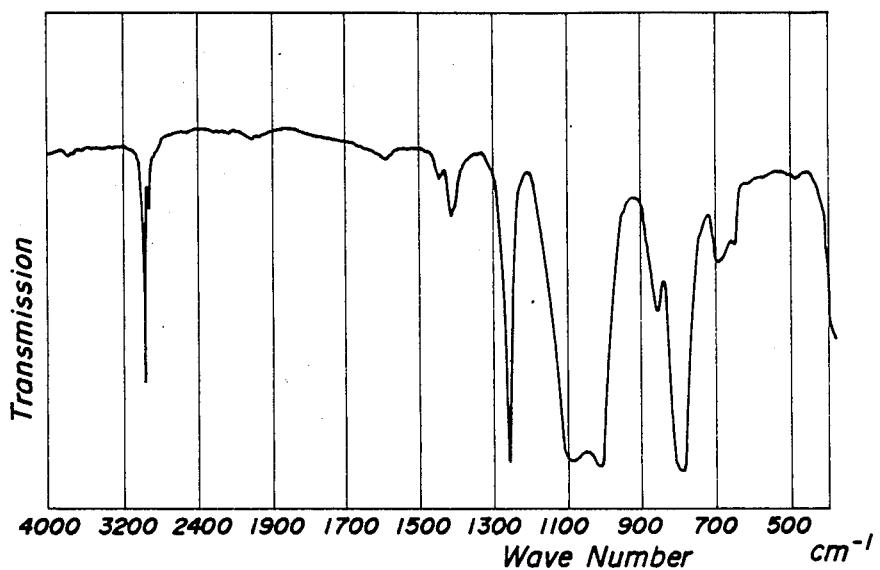
Figure 6:
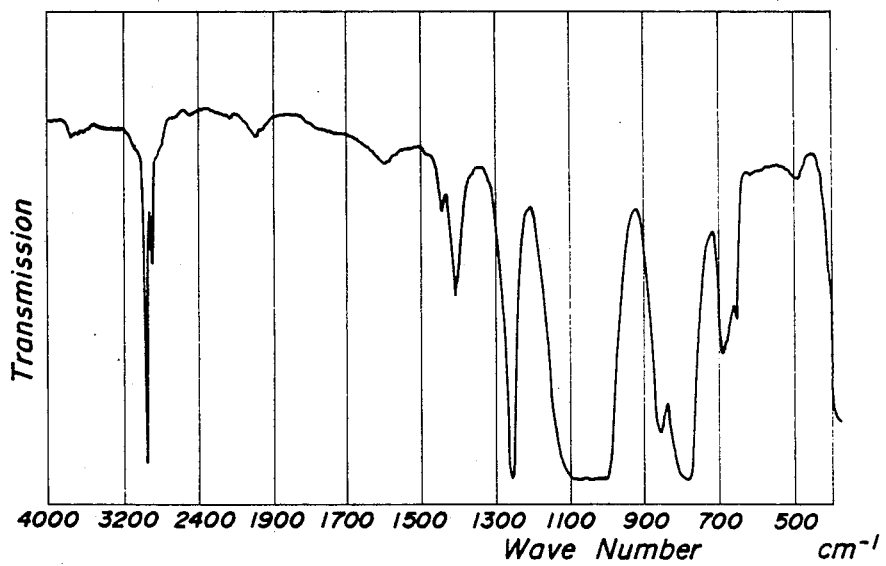

As is understood from the above given description, the starting material in the inventive method is the diorganopolysiloxane terminated at both molecular chain ends each with a silanolic hydroxy group as represented by the general formula (I), which is reacted in the step (a) with the oxime group-containing organosilane compound represented by the general formula (II). Even though the oxime-containing organosilane can be replaced with another organosilane compound having, in place of the oxime group —O—N=X, an acetoxy, isopropenyloxy or amido group to react with the silanol-terminated diorganopolysiloxane followed by the reaction with an alcohol $R^6OH$ to give a desired alkoxy-terminated organopolysiloxane, various disadvantages are unavoidable in the use of such organosilane compounds other than the oxime-containing silanes. When an acetoxy-containing organosilane is used instead, for example, the condensation product by the reaction thereof with the silanol groups is acetic acid while it is an extremely difficult matter to completely remove acetic acid from the reaction product so that the room temperature-curable organopolysiloxane composition formulated with such an alkoxy-terminated organopolysiloxane synthesized by this route cannot be used as a material in electronics because of the strong corrosiveness of acetic acid even in a trace amount. When the oxime-containing organosilane is replaced with an isopropenyloxy-containing organosilane, the reaction with the silanol-terminated diorganopolysiloxane should be accelerated by a catalyst such as a tetramethylguanidino-containing organosilane compound which also accelerates the hydrolysis-condensation reaction of the alkoxy-terminated diorganopolysiloxane so that the curable composition formulated therewith is subject to premature gelation. Although an amido group-containing organosilane compound can be reacted with the silanol-terminated diorganopolysiloxane without the aid of a catalyst, the amide compound produced as a by-product has a relatively high boiling point to be hardly removed by dissipation so that the room temperature-curable composition formulated with the alkoxy-terminated diorganopolysiloxane synthesized by the route using an amido group-containing organosilane cannot be used as a material in electronics due to the corrosiveness of the amide compound.

When an oxime group-containing organosilane is used to react with the silanol-terminated diorganopolysiloxane, on the other hand, the reaction can readily proceed even in the absence of any catalyst and the resultant alkoxy-terminated diorganopolysiloxane is stable under atmospheric air even not in a hermetically sealed condition in addition to the advantage of the absence of any corrosive compound formed as a by-product.

In the general formula (I) representing the silanolterminated diorganopolysiloxane as the starting material in the inventive method, each of the groups denoted by the symbol $R^1$ is a substituted or unsubstituted monovalent hydrocarbon group selected from the class consisting of methyl, vinyl, phenyl and 3,3,3-trifluoropropyl groups and the subscript n is a positive integer in the range from 20 to 1000. The diorganopolysiloxane should preferably have a viscosity in the range from 100 to 1,000,000 centistokes at 25° C.

In the step (a) of the inventive method, the above mentioned silanol-terminated diorganopolysiloxane is reacted with the organosilane compound represented by the general formula (II), in which $R^3$ is a substituted or unsubstituted monovalent hydrocarbon group selected from the class consisting of methyl, ethyl, propyl, vinyl, phenyl and 3,3,3-trifluoropropyl groups. The symbol X denotes a divalent group of the formula $=CR^4_2$ or

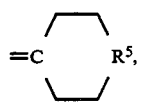

in which $R^4$ and $R^5$ are halogen-substituted or unsubstituted monovalent and divalent hydrocarbon groups, respectively.

Particular examples of the organosilane compound in conformity with the above given definition include those compounds expressed by the following structural formulas, in which the symbols Me, Et, Pr, Vi and Ph denote methyl, ethyl, propyl, vinyl and phenyl groups, respectively: MeSi(O—N=CMe$_2$)$_3$, MeSi(O—N=CMeEt)$_3$, ViSi(O—N=CMe$_2$)$_3$, ViSi(O—N=CMeEt)$_3$, EtSi(O—N=CMe$_2$)$_3$, EtSi(O—N=CMeEt)$_3$, PrSi(O—N=CMe$_2$)$_3$, PrSi(O—N=CMeEt)$_3$, PhSi(O—N=CMe$_2$)$_3$, PhSi(O—N=CMeEt)$_3$,

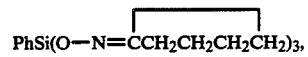

CF$_3$CH$_2$CH$_2$Si(O—N=CMe$_2$)$_3$,
CF$_3$CH$_2$CH$_2$Si(O—N=CMeEt)$_3$, and

of which the compounds of the second and the fourth structural formulas are particularly preferred.

The reaction of the silanol-terminated diorganopolysiloxane of the general formula (I) and the oxime-containing organosilane compound of the general formula (II) can readily proceed at an adequate velocity at room temperature even in the absence of any catalyst merely by agitating the mixture of them to give the intermediate oxime-terminated diorganopolysiloxane represented by the general formula (III). The reaction should be performed under a substantially anhydrous condition in order to obtain a high yield of the intermediate product. The amount of the oxime-containing organosilane compound in this reaction mixture should be at least equimolar to the terminal silanol groups in the silanol-terminated diorganopolysiloxane. When the amount thereof is too small, the silanol groups of the diorganopolysiloxane may remain unreacted correspondingly while extension of the reaction time only has an effect of unduly increasing the viscosity of the diorganopolysiloxane which can no longer be used in the formulation as desired. It is presumable that the reaction between the silanol-terminated diorganopolysiloxane of the general formula (I) and the oxime-containing organosilane compound of the general formula (II) proceeds rapidly at room temperature even in the absence of any catalyst because one of the three oxime groups in the silane molecule has a higher reactivity than the other two with the silanol group. The reaction can be sometimes further accelerated when the reaction mixture is diluted to have a decreased viscosity by adding an organic solvent such as toluene and xylene.

The thus obtained intermediate diorganopolysiloxane having two oxime groups at each of the molecular chain ends and represented by the general formula (III) is then reacted with a monohydric alcohol represented by the general formula R⁶OH, in which R⁶ is a monovalent hydrocarbon group having 1 to 8 carbon atoms, such as methyl and ethyl alcohols, to give the desired alkoxy-terminated diorganopolysiloxane represented by the general formula (V). The amount of the monohydric alcohol in the reaction mixture should be at least 1 mole or, preferably, in the range from 5 to 20 moles per mole of the oxime groups in the oxime-containing organosilane compound used in the reaction of the step (a). When the amount of the alcohol is smaller than above, a part of the oxime groups in the intermediate diorganopolysiloxane may remain unreacted. The reaction is performed preferably at a temperature in the range from 50° to 100° C. and the reaction proceeds at an adequate velocity even in the absence of any catalyst. If desired, the reaction mixture can be diluted by adding an organic solvent. After completion of the reaction, the reaction mixture is subjected to stripping under reduced pressure at an elevated temperature to be freed from the oxime compound as the by-product, the excess volume of the alcohol and, when used in the reaction, the solvent so that the desired product of the alkoxy-terminated diorganopolysiloxane is isolated, which is useful as the base ingredient of room temperature-curable silicone rubber compositions storable in one package.

In the following, the method of the present invention is described in more detail by way of examples, in which each of the values of viscosity refers to that obtained by the measurement at 25° C.

EXAMPLE 1

Into a flask of 1-liter capacity equipped with a stirrer, a thermometer and a reflux condenser were introduced 500 g of a dimethylpolysiloxane having a viscosity of 1300 centistokes and terminated at both molecular chain ends each with a silanolic hydroxy group to give a silanol content of 0.0106 mole/100 g and 21.5 g of an oxime-containing organosilane compound of the formula MeSi(O—N=CMeEt)₃ were added at 23° C. to the dimethylpolysiloxane in the flask under agitation. The molar ratio of the oxime-containing organosilane to the silanol groups Si-OH in the reaction mixture was 1.3.

After agitation of the reaction mixture for 1 hour at the same temperature, the reaction mixture was admixed with 24.6 g of methyl alcohol to give a molar ratio of methyl alcohol to the oxime groups of 5 and heated under agitation for 5 hours at 70° C. under reflux followed by stripping at 150° C. under a reduced pressure of 10 mmHg to remove the methyl ethyl ketoxime MeEtC=N—OH and methyl trimethoxy silane MeSi(OMe)₃ as the by-products of the reactions and the excess amount of methyl alcohol so that 510 g of an oily product were obtained which had a viscosity of 1350 centistokes, specific gravity of 0.978 and refractive index of 1.4043 at 25° C.

The analysis of this product for the content of methoxy groups gave a result of 0.0220 mole/100 g, which was in good coincidence with the calculated value of 0.0212 mole/100 g. This analytical results as combined with the infrared absorption spectrum shown in FIG. 1 of the accompanying drawing supported that the product could be expressed by the formula

$(MeO)_2(Me)Si-O+SiMe_2-O_{\overline{240}}Si(Me)(OMe)_2$.

Figure 8:
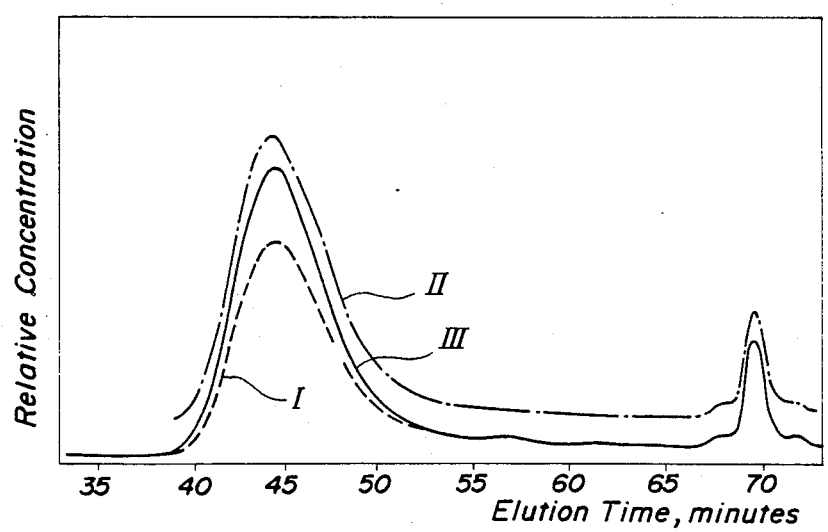
FIGS. 8 to 10 each illustrate a gel-permeation chromatographic diagrams representing the molecular weight distribution of the starting and product organopolysiloxanes in Examples 1 and 2, Examples 3 and 4 and Examples 5 and 6, respectively.

FIG. 8 of the accompanying drawing shows the diagrams of the gel-permeation chromatography undertaken of the starting silanol-terminated dimethylpolysiloxane (curve I) and of the methoxy-terminated dimethylpolysiloxane as the product (curve II) representing the respective molecular weight distribution.

EXAMPLES 2 to 6

The experimental procedure in each of the Examples for the preparation of a methoxy-terminated dimethylpolysiloxane was substantially the same as in Example 1 except that the starting silanol-terminated dimethylpolysiloxane, the amount thereof, the oxime-containing organosilane compound, the amount thereof and the amount of methyl alcohol used in the reaction were as indicated in Table 1, in which:

Dimethylpolysiloxane I was the same as used in Example 1;

Dimethylpolysiloxane II had a viscosity of 5100 centistokes containing 0.00705 mole of silanol groups per 100 g;

Dimethylpolysiloxane III had a viscosity of 19,200 centistokes containing 0.00401 mole of silanol groups per 100 g;

Oximesilane I was the same oxime-containing silane compound as used in Example 1; and Oximesilane II was vinyl tri(methyl ethyl ketoxime) silane of the formula ViSi(O—N=CMeEt)₃.

Table 1 also indicates the molar ratio of the oxime-containing silane compound to the silanol groups in the silanol-terminated dimethylpolysiloxane in the reaction mixture for the first step reaction and the molar ratio of the oxime groups in the oxime-containing silane used in the first step reaction to the methyl alcohol in the reaction mixture for the second step reaction in each of the Examples.

Figure 9:
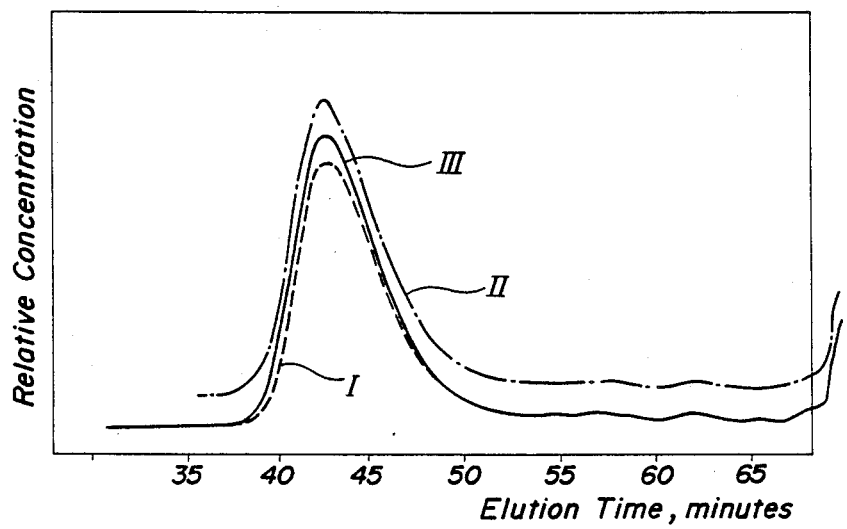
Figure 10:
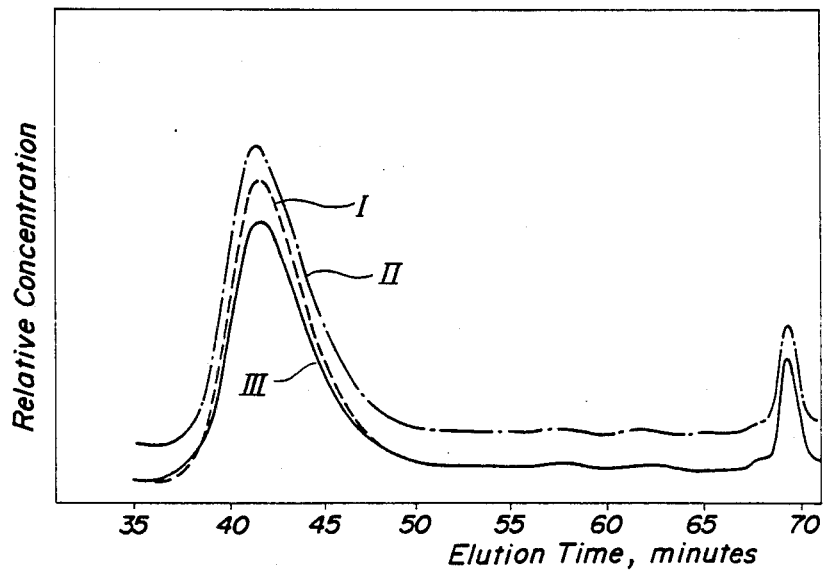

The results of the analyses and measurements undertaken of the alkoxy-terminated dimethylpolysiloxane products in these Examples are summarized in Table 1 including the viscosity in centistokes, specific gravity, refractive index at 25° C., calculated and found contents of methoxy groups in moles/100 g, and calculated and found contents of vinyl groups in moles/100 g. An infrared absorption spectrum of each of the alkoxy-terminated dimethylpolysiloxane products prepared in Examples 2 to 6 is shown in FIGS. 2 to 6, respectively. Further, gel permeation chromatographic diagrams representing the molecular weight distribution are given in FIGS. 8 to 10 by the curve I in FIG. 9 for the starting silanol-terminated dimethylpolysiloxane II used in Examples 3 and 4; curve I in FIG. 10 for the dimethylpolysiloxane III used in Examples 5 and 6; and curve III in FIG. 8, curves II and III in FIG. 9 and curves II and III in FIG. 10 for the alkoxyterminated dimethylpolysiloxane products obtained in Examples 2 to 6, respectively.

TABLE 1

| Example No. | 2 | 3 | 4 | 5 | 6 |
|---|---|---|---|---|---|
| Dimethylpolysiloxane | I | II | II | III | III |
| Oximesilane | II | I | II | I | I |
| (g) | (20.8) | (13.3) | (12.8) | (10.35) | (9.95) |
| (Oximesilane)/(silanol), molar ratio | 1.3 | 1.2 | 1.2 | 1.5 | 1.5 |
| Methyl alcohol, g | 63.0 | 29.5 | 59.0 | 49.4 | 74.0 |
| (Methyl alcohol)/(oximesilane), molar ratio | 8 | 10 | 20 | 20 | 30 |
| Properties of product | | | | | |
| Viscosity, centistokes | 1,300 | 5,320 | 5,230 | 22,700 | 22,750 |
| Specific gravity | 0.978 | 0.980 | 0.980 | 0.975 | 0.979 |
| Refractive index | 1.4041 | 1.4042 | 1.4040 | 1.4045 | 1.4040 |
| Content of methoxy groups, moles/100 g | | | | | |
| found | 0.0215 | 0.0145 | 0.0143 | 0.0085 | 0.0086 |
| calculated | 0.0212 | 0.0141 | 0.0141 | 0.00882 | 0.00882 |
| Content of vinyl groups, moles/100 g | | | | | |
| found | 0.0110 | — | 0.0071 | — | 0.0045 |
| calculated | 0.0106 | — | 0.00705 | — | 0.00441 |

EXAMPLE 7

Into a flask of 1-liter capacity were introduced 500 g of a 3,3,3-trifluoropropyl methyl polysiloxane having a viscosity of 48,600 centistokes and terminated at both molecular chain ends each with a silanolic hydroxy group corresponding to a silanol content of 0.0064 mole per 100 g, which was admixed with 13.0 g of oximesilane II (see preceding Examples) to give a molar ratio of the oxime-containing silane to the silanol groups of 1.3 and the reaction was performed at room temperature for 1 hour.

Figure 7:
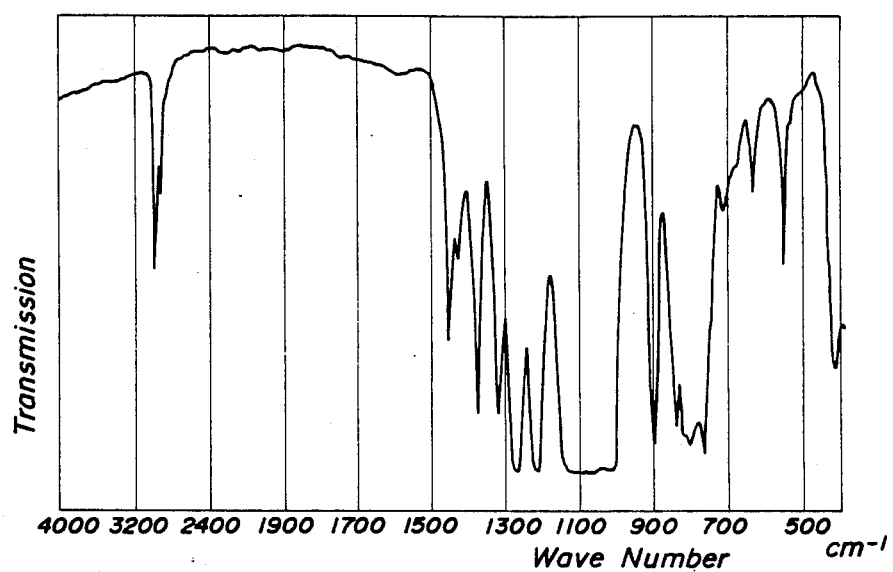

Thereafter, the reaction mixture was admixed with 29.6 g of methyl alcohol to give a molar ratio of methyl alcohol to the oxime groups of 1.0 and agitated at 70° C. for 5 hours to perform the substitution reaction of methoxy groups for the oxime groups followed by stripping at 150° C. under a reduced pressure of 10 mmHg to be freed from methyl etnyl ketoxime and vinyl trimethoxy silane as the by-products in the reactions and the excess amount of methyl alcohol. The resultant product was an oily viscous fluid having a viscosity of 56,000 centistokes, specific gravity of 1.30 and refractive index of 1.3827 at 25° C. and containing 0.0129 mole of methoxy groups per 100 g. The results of the analysis including infrared absorption spectroscopy giving the infrared absorption spectrum shown in FIG. 7 supported that this product was a methoxy-terminated diorganopolysiloxane expressed by the formula

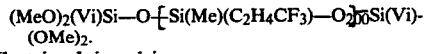

What is claimed is:

1. A method for the preparation of an alkoxy-terminated organopolysiloxane which comprises the successive steps of:

(a) reacting a silanol-terminated diorganopolysiloxane represented by the general formula

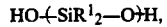

in which each $R^1$ is a monovalent group selected from the class consisting of methyl, vinyl, phenyl and 3,3,3-trifluoropropyl groups and the subscript n is a positive integer, with an organosilane compound represented by the general formula

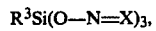

in which $R^3$ is a monovalent group selected from the class consisting of methyl, ethyl, propyl, vinyl, phenyl and 3,3,3-trifluoropropyl groups and X is a divalent group represented by the general formula $=CR^4_2$, $R^4$ being a halogen-substituted or unsubstituted monovalent hydrocarbon group, or

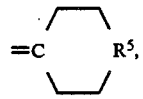

$R^5$ being a halogen-substituted or unsubstituted divalent hydrocarbon group, in a molar ratio of the silane compound to the silanol groups in the diorganopolysiloxane of at least 1 under a substantially anhydrous condition to form an intermediate oxime-terminated diorganopolysiloxane represented by the general formula

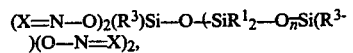

in which $R^1$, $R^3$, X and n each have the same meaning as defined above; and (b) reacting the intermediate oxime-terminated diorganopolysiloxane with a monohydric alcohol represented by the general formula

in which $R^6$ is a monovalent hydrocarbon group having 1 to 8 carbon atoms, in a molar ratio of the monohydric alcohol to the oxime groups of the formula $-O-N=X$ in the intermediate oxime-terminated diorganopolysiloxane of at least 1 to form an alkoxy-terminated diorganopolysiloxane represented by the general formula

in which $R^1$, $R^3$, $R^6$ and n each have the same meaning as defined above.

2. The method for the preparation of an alkoxy-terminated organopolysiloxane as claimed in claim 1 wherein the subscript n is a positive integer in the range from 20 to 1000.

3. The method for the preparation of an alkoxy-terminated organopolysiloxane as claimed in claim 1 wherein $R^4$ is a methyl or an ethyl group.

4. The method for the preparation of an alkoxy-terminated organopolysiloxane as claimed in claim 1 wherein $R^5$ is a butylene group of the formula —CH$_2$CH$_2$CH$_2$CH$_2$—.

5. The method for the preparation of an alkoxy-terminated organopolysiloxane as claimed in claim 1 wherein the monohydric alcohol is methyl alcohol.

6. The method for the preparation of an alkoxy-terminated organopolysiloxane as claimed in claim 1 wherein the reaction of the step (b) is performed at a temperature in the range from 50° to 100 °C.

* * * * *

UNITED STATES PATENT AND TRADEMARK OFFICE
CERTIFICATE OF CORRECTION

Page 1 of 2

PATENT NO. : 4,658,006
DATED : April 14, 1987
INVENTOR(S) : Yoshio Inoue

It is certified that error appears in the above-identified patent and that said Letters Patent is hereby corrected as shown below:

Due to printing error:

Column 8, line 57, claim 1(b), the formula reading:

$(R^6O)_2(R^3)Si-O-(SiR^1_2-O)-Si(R^3)(OR^6)_2$ should read:

$(R^6O)_2(R^3)Si-O-(SiR^1_2-O)_n-Si(R^3)(OR^6)_2$ .

Column 8, line 41, claim 1(a), the formula reading:

$(X=N-O)_2(R^3)Si-O-(SiR^1_2-O_n-Si(R^3)(O-N=X)_2$ should read:

$(X=N-O)_2(R^3)Si-O-(SiR^1_2-O)_n-Si(R^3)(O-N=X)_2$ .

Column 2, formula III, reading:

$(X=N-O)_2(R^3)Si-O-(SiR^1_2-O_n-Si(R^3)(O-N=X)_2$ should read:

$(X=N-O)_2(R^3)Si-O-(SiR^1_2-O)_n-Si(R^3)(O-N=X)_2$ .

Column 2, formula V, reading:

UNITED STATES PATENT AND TRADEMARK OFFICE
CERTIFICATE OF CORRECTION

PATENT NO. : 4,658,006

DATED : April 14, 1987

INVENTOR(S) : Yoshio Inoue

It is certified that error appears in the above-identified patent and that said Letters Patent is hereby corrected as shown below:

$$(R^6O)_2(R^3)Si-O-(SiR^1_2-O)_n Si(R^3)(OR^6)_2 \text{ should read:}$$

$$(R^6O)_2(R^3)Si-O-(SiR^1_2-O)_n Si(R^3)(OR^6)_2 \text{ .}$$

Signed and Sealed this

Nineteenth Day of January, 1988

Attest:

DONALD J. QUIGG

*Attesting Officer*     *Commissioner of Patents and Trademarks*